F. J. CARTLEDGE.
DEVICE FOR HANDLING AND CONVEYING TEXTILE OR OTHER ARTICLES AND MATERIALS.
APPLICATION FILED JUNE 15, 1917.
1,367,017.
Patented Feb. 1, 1921.
3 SHEETS—SHEET 2.
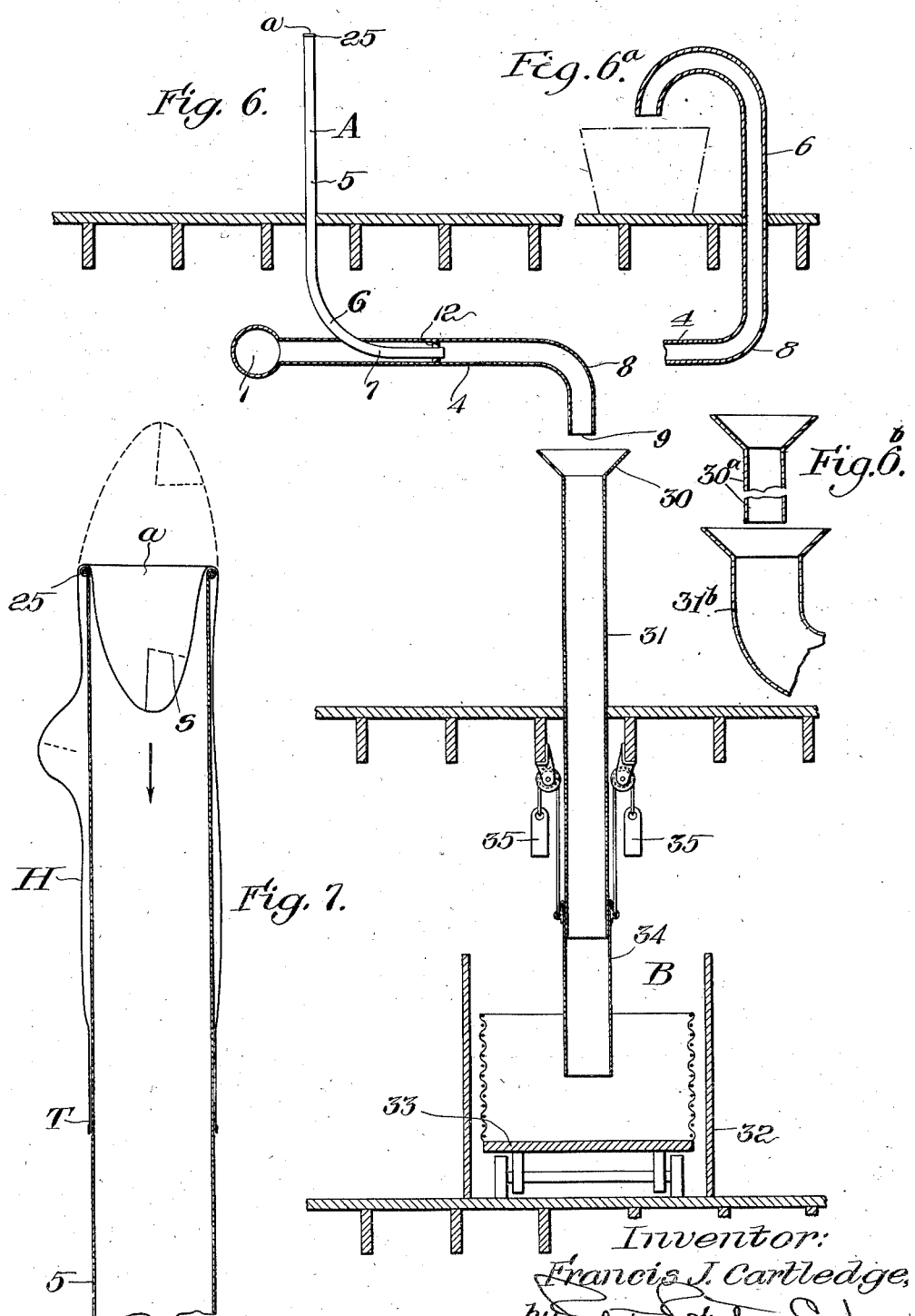

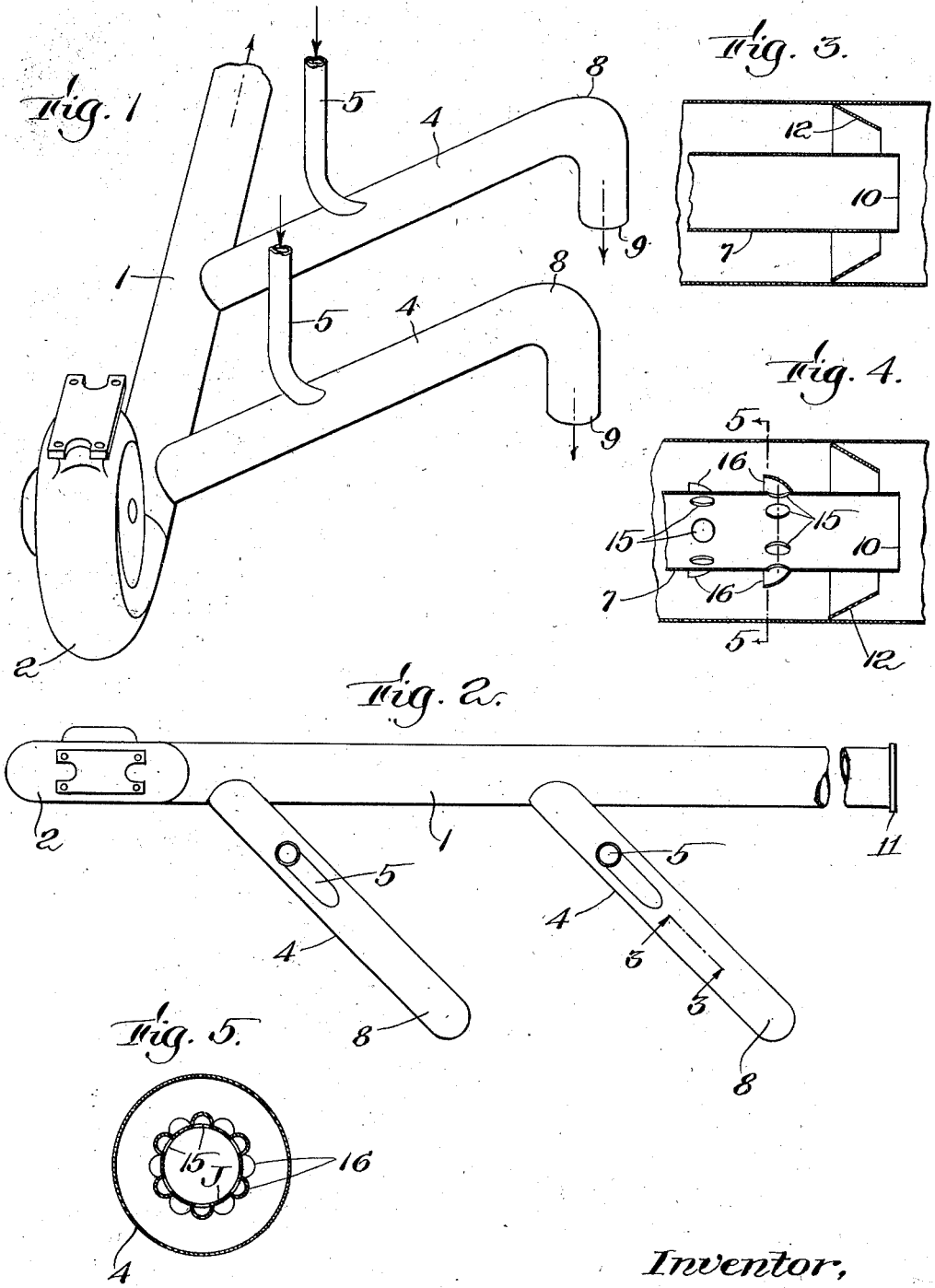

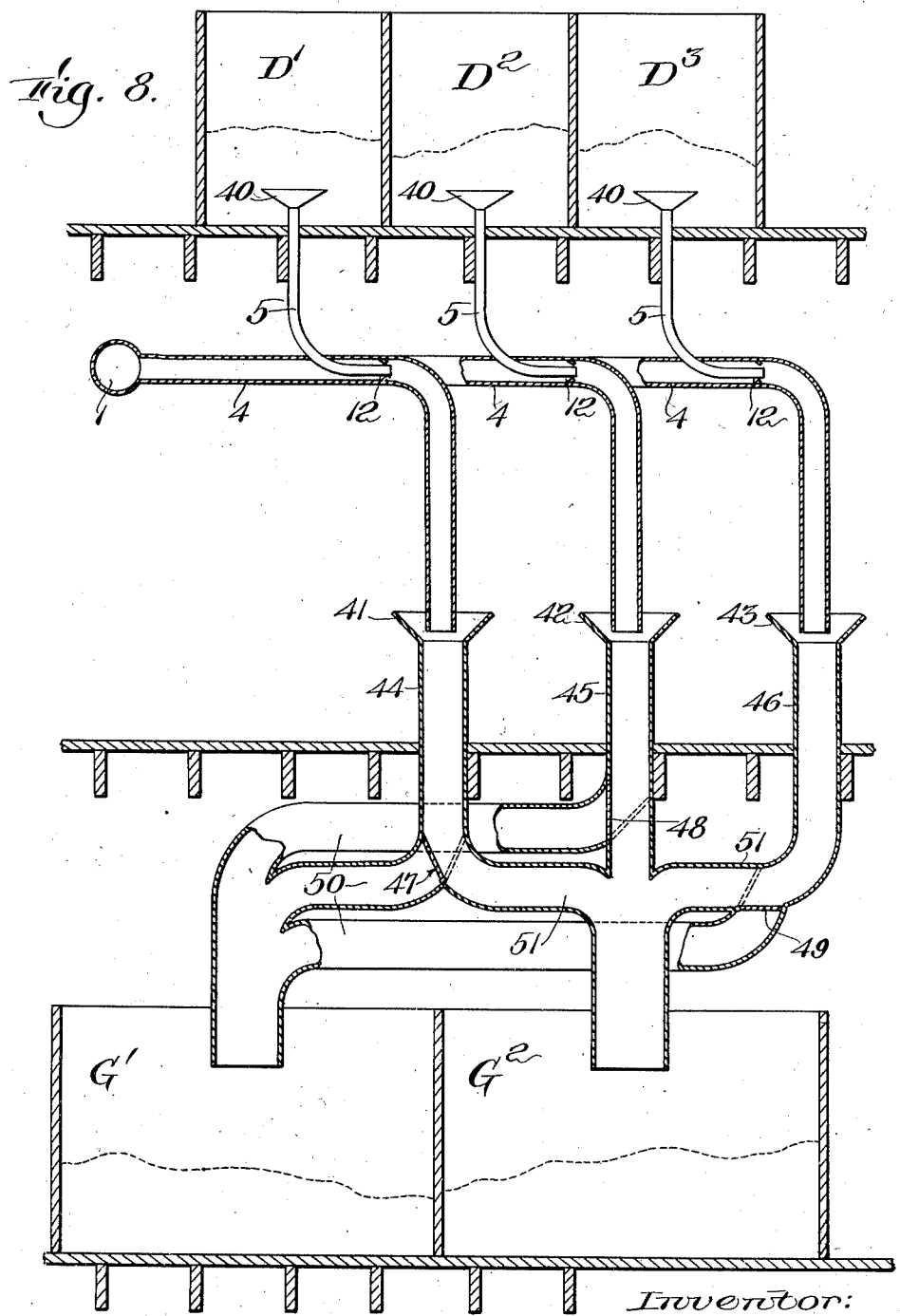

UNITED STATES PATENT OFFICE.

FRANCIS J. CARTLEDGE, OF IPSWICH, MASSACHUSETTS, ASSIGNOR TO IPSWICH MILLS, OF IPSWICH, MASSACHUSETTS, A CORPORATION OF MASSACHUSETTS.

DEVICE FOR HANDLING AND CONVEYING TEXTILE OR OTHER ARTICLES AND MATERIALS.

1,367,017.     Specification of Letters Patent.     Patented Feb. 1, 1921.

Application filed June 15, 1917. Serial No. 174,889.

*To all whom it may concern:*

Be it known that I, FRANCIS J. CARTLEDGE, a citizen of the United States, and resident of Ipswich, in the county of Essex and State of Massachusetts, have invented new and useful Improvements in Devices for Handling and Conveying Textile or other Articles and Materials, of which the following is a specification.

This invention relates to devices for handling and conveying light, flexible or flocculent articles or materials pneumatically.

In many situations such as in spinning, weaving or knitting mills and other textile manufactories the raw materials or stage products or the finished product, or all of these, have to be moved from place to place as required, sometimes to considerable distances. It is desirable to convey these commodities as conveniently and rapidly as possible while protecting them from dirt or dust and in such a manner as not to subject the inflammable commodity to increased danger from fire. In the manufacture of tubular or closed tubular textile articles, such as bags, pillow cases, or stockings, it is likewise desirable to provide for turning the tubular article inside out.

Heretofore some but not all of the conditions mentioned have been satisfied by conveyer or article handling devices of well-known kinds, but so far as I am aware no device suitable for the classes of articles or commodities above referred to has been available which did not have the defect of subjecting the material conveyed by it to contact with rapidly moving parts, as for instance, by permitting the material to pass through or in contact with a blast-fan or rotating screen.

One object of the present invention is to provide pneumatic conveyer devices for commodities of the class indicated which shall move the article or material conveyed without subjecting it to passage through a fan or contact with any moving mechanism. Another object is to provide such conveyer devices with delivery apparatus characterized by progressive slowing of the conveying blast as the article or material approaches its destination. Another object is to provide for turning inside out a tubular article and delivering the turned article with a minimum of manual handling. Other objects are to provide a simple pneumatic system of conveyance characterized by effective provisions for moving the article or material to be conveyed by the direct action of air moving in the system under impulsion of an ordinary blast fan, this system permitting the separate use of as many receiving and delivery stations as desired, or the delivery at one place of material or articles received at a plurality of places. Another object is to provide for maintaining effective suction at the receiving end or ends of the system without recourse to valved openings or other complications, and nevertheless to permit the conveyance of the article or material in the blast blown from a single blast apparatus furnishing energy for the entire system. Another object is to provide a pneumatic stocking turning and conveying device adapted to be used by unskilled persons rapidly and effectively to turn and deliver at a predetermined distant place, such as a dyehouse or looper room the partly finished stockings, the turning means being combined with the conveyer means.

I shall now describe my new devices by reference to particular species thereof illustrating the generic invention.

In the accompanying drawings,

Figure 1 is a perspective of a fan, blast-trunk, and receiving and delivery connections illustrating one species of the genus of my invention;

Fig. 2 is a plan view of the devices shown in Fig. 1;

Fig. 3 is an enlarged longitudinal section through the blast and suction orifices on the line 3—3 of Fig. 2;

Fig. 4 is a view similar to Fig. 3, showing a modification;

Fig. 5 is a section on the line 5—5 of Fig. 4;

Fig. 6 is a vertical section illustrating a receiving and a delivery station;

Fig. 6ª similarly shows a modified form at the delivery station;

Fig. 6ᵇ shows a modification for further reducing the speed of the article or material conveyed in the conveyer pipe section;

Fig. 7 is an enlarged vertical section at a receiving station illustrating use of the device for turning stockings; and Fig. 8 is a diagram section illustrating use of the device for conveying material from any of three receiving stations to two delivery stations.

I prefer to arrange the system for continuous activity of the conveying means. Referring now to Figs. 1, 2, and 6, a blast trunk 1 is fixed in a convenient place, preferably under the floor of the room in which are most of the receiving stations A, and a continuous blast is blown through trunk 1 by a fan or other blower 2, which may be driven by an electric motor, and may be of any suitable type. A series of branch blast-conveyer pipes 4 take out of the blast trunk 1, preferably at an inclination toward the direction of blast as shown. One branch 4 is provided for each receiving station A, and at each station A a suction entrance pipe 5 for receiving the thing to be conveyed terminates at a convenient place, for instance, being fixed in the floor to project to a height in easy reach of a seated operator. Whatever the particular arrangement of the pipes 5, said pipes are curved about a large radius, as at 6, to enter the branch blast-pipe 4 in the direction of blast, and are supported so that a straight portion 7 of the pipe 5 is substantially coaxial with the branch 4. Any convenient supporting means, as a soldered joint between sheet metal pipes 4 and 5 at their point of contact may be employed.

The branch 4 continues beyond the end of the portion 7 of the pipe 5 a substantial distance without decrease of its internal capacity or sharp bends, preferably extending a substantial distance as shown in a straight line before reaching the first bend 8, which may be turned in any direction desired, either downward as shown in Fig. 6, or upward through the floor as shown at 6 in Fig. 6ª to deliver in the receiving room, or in the direction appropriate to reach some other desired destination. In whatever direction the bend 8 extends, the distance from the portion 7 of pipe 5 to a free end 9 beyond the bend 8 is a short distance, so that there is little effect in this part of the branch 4 to impede the free movement of the blast and material conveyed by the air-current.

An effective and continuous suction is maintained in the entrance pipe 5 by the ejector action of the blast in pipe 4. Referring to Fig. 3, this effect may if desired be increased by fixing in the branch 4 and head of the terminal 10 of the portion 7 of the pipe 5 any suitable contracting device, such as the cone 12, whereby to deliver the blast in pipe 4 as an annular stream having a *vena contracta* beyond the free end 10 of the pipe 5. I have determined by successful use that the inflow created in the pipe 5 by a device substantially of the proportions shown is strong and reliable to propel a flexible or light article placed near the entrance *a* of the pipe 5 with certainty and force.

For some classes of use, I prefer to modify the flow-path of the blast at the suction device as illustrated in Figs. 4 and 5, by providing a number of entrances 15 to the portion 7 of pipe 5 for the blast in pipe 4, each entrance 15 preferably having a conical or part-spherical baffle 16 mounted on the pipe 5 to deflect toward the center of the portion 7 of said pipe 5 an independent stream from the blast in pipe 4. There may be two or more annular series of the entrances 15, and preferably these series are staggered as shown. I attribute to the entrances 15 and baffles 16 the effect of directing the things moving in the pipe 5 away from its inner surface, as well as the effect to maintain inflow of air at entrance *a*.

Usually an article or material delivered from the end 9 of the branch 4 is destined to be carried elsewhere in the building, as to a dye-room or storage bin. My device therefore may comprise means for utilizing the blast delivered at 9 for further conveying the material or article to its destination, said means being so arranged as to reduce the velocity of the material as compared with its speed while in the pipe 4. By so reducing the speed of the thing conveyed, delivery may be made without any special trapping or straining devices at the receiving end or ends of the system.

As shown in Fig. 6, the pipe 4 may end above a funnel 30 of a conveyer pipe 31 of larger size than the pipe 4, a sufficient space being provided between the end 9 and funnel 30 to permit scattering and reduction of pressure of the blast. The pipe 31 may either deliver directly into a storage bin 32 or truck 33 (being extended to any desired direction or distance) at receiving station B, there to deliver the commodity ejected at 9 by means of flow in the pipe 31 of the blast from pipe 4. The delivery end may if desired have a sleeve 34 counter-weighted at 35 for adjustment to any desired height above the floor of the bin 32 or truck 33.

It will be observed that the conveyer pipe system comprising the pipes 5, 4, and 31, is in sections 4 and 31 spaced apart as between 9 and 30, Fig. 6, and that by this device the blast in pipe section 4 is independent of back pressure caused by the conditions of flow in pipe section 31. Section 31 may be likewise divided into two or more sections, 31ª, 31ᵇ, Fig. 6ᵇ if necessary or desirable further to render any preceding section of the system independent from back-pressure created in any following section.

In the use illustrated in Figs. 6 and 7, in a knitting mill, let it be assumed that any desired plurality of stations A are in the room or department completing the stockings H, Fig. 7, so far as to loop the toe-seam s, the stockings so far finished being wrong side out. The entrance pipe 5 may be about two inches in diameter, and terminate in a smooth bead or round 25, upon which the open tops T of the stockings are placed, the stocking being drawn down outside of the pipe 5 by a rapid manual movement by the operator. The toe end of the stocking when it is drawn upon the pipe 5 is sucked within the pipe, drawing the remainder of the stocking about bead 25 after it, the stocking (now turned right side out) passing through pipes 5, 4, and 31 to its destination as soon as the operator releases it. The same operation is applicable to bags or the like, or the legs or sleeves of other garments than stockings, or a length of continuous tube may be drawn upon the pipe 5 and turned upon releasing its upper end into the orifice a.

In Fig. 8 an application of the invention to delivery of material in bulk, such as cotton, from any or all of the bins D', D², D³, to either of the receiving stations G', or G², is shown. The blast trunk 1, branches 4, suction pipes 5 and suction devices at 12 are the same as above referred to. The pipes 5 for the respective receiving stations are provided with hoppers 40 into which the desired amounts of cotton from the respective bins D', D², D³ for a mixture can be shoveled.

The several pipes 4 deliver at funnels 41, 42, 43, of larger pipes 44, 45, 46, which respectively are provided with valves 47, 48, 49 controlling the entrance either to branches 50 leading to bin G' or branches 51 leading to bin G². By shifting the valves material from either of the bins D', D², D³, may be delivered to either destination G' or G², and material from two or more of the bins D', D², D³, may be delivered in the same bin G' or G². The progressively slowing blasts of the various pipes are well adapted for delivering such material as cotton without disturbance of the mass previously delivered.

In each of the illustrated forms of the invention the risk of fire is materially reduced by the freedom from contact with moving parts of the commodity carried by the blast. The end of the blast trunk 1 beyond the last branch 4 is closed by a suitable cap 11, Fig. 2.

I claim:

1. Pneumatic material handling devices having therein a conveyer pipe system for material to be conveyed by pneumatic blast, said system comprising sections spaced apart at one or more points, a following section being of larger diameter than the preceding section, means for maintaining a pressure blast in one of the sections of smaller diameter, and means for delivering material into the blast to be conveyed thereby at decreasing speed in successive sections.

2. Pneumatic material handling devices having therein in combination an entrance pipe, a blast-conveyer pipe adapted to receive material conveyed through said entrance pipe by suction created by the blast in said blast-conveyer pipe, and a conveyer pipe spaced from said blast-conveyer pipe and adapted to receive the air-blast and the material discharged by said blast-conveyer pipe, whereby to convey said material at a decreasing velocity.

3. Pneumatic material handling devices having therein in combination an entrance pipe, a blast-conveyer pipe adapted to receive material conveyed through said entrance pipe by suction created by the blast in said blast-conveyer pipe, and a conveyer pipe larger than, in line with, and spaced from said blast-conveyer pipe and adapted thereby to receive the air-blast and the material discharged by said blast-conveyer pipe, whereby to convey said material at a decreased velocity.

4. Pneumatic material handling devices adapted for turning and conveying tubular textile articles comprising a blast-conveyer pipe and means for maintaining a pressure blast therein, an entrance-pipe adapted to receive the tubular article on the outside thereof, and a suction device for causing the blast in said blast-conveyer pipe to maintain a suction inflow in said entrance pipe.

5. Pneumatic material handling devices adapted for turning and conveying tubular textile articles comprising a blast-conveyer pipe and means for maintaining a pressure blast therein, an entrance-pipe adapted to receive the tubular article on the outside thereof, communicating directly with said blast-conveyer pipe, the orifice of said entrance pipe being rounded whereby to enable a fabric to be turned thereat, and a suction device adapted to maintain suction in said entrance pipe.

6. Pneumatic material handling devices adapted for turning and conveying tubular textile articles comprising a blast-conveyer pipe and means for maintaining a blast therein, a conveyer pipe adapted to receive an article blown from said blast-conveyer pipe for transmission to destination at a reduced velocity, an entrance pipe adapted to receive the tubular article on the outside thereof, and a suction device adapted to maintain suction in said entrance pipe.

7. Pneumatic material handling and conveying devices having therein a blast-conveyer pipe and means for maintaining a blast therein, an entrance pipe terminating in a portion included within said blast-conveyer pipe, means for determining flow into said portion from said blast-conveyer pipe of a part of the blast, and means for constricting the blast-conveyer pipe to a narrow annular passage at or near the end of said entrance pipe.

8. Pneumatic material handling and conveying devices having therein a blast-conveyer pipe and means for maintaining a blast therein, an entrance pipe terminating in a portion included within said blast-conveyer pipe, means including apertures distributed around said entrance pipe for determining flow into said portion from said blast-conveyer pipe of a part of the blast, and means for constricting the blast-conveyer pipe to a narrow annular passage at or near the end of said entrance pipe.

9. Pneumatic material handling and conveying means comprising in combination a blast blower, a series of conveyer pipes separated from each other and progressively larger whereby progressively to reduce the velocity of the blast and material carried thereby, and entrance means for the material comprising an entrance pipe and a suction device therefor adapted to maintain an inflow of air through said entrance pipe by the operation of the blast blown by said blower.

Signed by me at Boston, Massachusetts, this twenty-fifth day of May, 1917.

FRANCIS J. CARTLEDGE.